United States Patent
Arbel et al.

(10) Patent No.: US 12,095,786 B1
(45) Date of Patent: Sep. 17, 2024

(54) SYSTEM AND METHOD FOR GENERATING CYBERSECURITY REMEDIATION IN COMPUTING ENVIRONMENTS

(71) Applicant: Wiz, Inc., New York, NY (US)

(72) Inventors: Itay Arbel, Tel Aviv (IL); Roy Reznik, Tel Aviv (IL); Bar Magnezi, Tel Aviv (IL); Erez Eyal, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/543,497

(22) Filed: Dec. 18, 2023

(51) Int. Cl.
*H04L 9/40* (2022.01)
*G06F 21/56* (2013.01)
*H04L 41/16* (2022.01)

(52) U.S. Cl.
CPC ........ *H04L 63/1416* (2013.01); *G06F 21/568* (2013.01); *H04L 41/16* (2013.01)

(58) Field of Classification Search
CPC .... H04L 63/1416; H04L 41/16; G06F 21/568
See application file for complete search history.

(56) References Cited

U.S. PATENT DOCUMENTS

| | | | |
|---|---|---|---|
| 9,009,836 B1* | 4/2015 | Yarykin | G06F 9/45558 726/25 |
| 11,121,872 B2 | 9/2021 | Digiambattista et al. | |
| 11,237,897 B2* | 2/2022 | Bhatia | G06N 20/20 |
| 11,310,238 B1* | 4/2022 | Vashisht | H04L 63/1433 |
| 11,539,748 B2 | 12/2022 | Digiambattista et al. | |
| 11,886,585 B1* | 1/2024 | Davis | G06F 21/566 |
| 2015/0264077 A1* | 9/2015 | Berger | G06F 21/51 726/23 |
| 2017/0243009 A1* | 8/2017 | Sejpal | G06F 21/577 |
| 2018/0026995 A1* | 1/2018 | Dufour | H04W 12/128 726/23 |
| 2019/0171811 A1* | 6/2019 | Daniel | G06F 21/53 |
| 2021/0334386 A1* | 10/2021 | AlGhamdi | G06F 9/542 |
| 2022/0130274 A1* | 4/2022 | Krishna Raju | H04L 63/1433 |
| 2022/0187813 A1* | 6/2022 | Khurshudov | G05B 23/024 |
| 2023/0164567 A1* | 5/2023 | Fellows | H04L 41/16 455/410 |
| 2023/0300166 A1* | 9/2023 | Zafar | G06F 21/552 726/23 |
| 2023/0412491 A1* | 12/2023 | Rahman | H04L 41/16 |
| 2024/0080332 A1* | 3/2024 | Ganesh | G06F 16/951 |

FOREIGN PATENT DOCUMENTS

WO WO-2022129085 A1 * 6/2022 ............. G06F 21/55

* cited by examiner

*Primary Examiner* — Christopher A Revak
(74) *Attorney, Agent, or Firm* — M&B IP Analysts, LLC (57) ABSTRACT

A system and method for generating a remediation action in a computing environment based on a cybersecurity inspection. The method includes: inspecting a computing environment for a cybersecurity object; detecting a cybersecurity issue in the computing environment based on detection of the cybersecurity object; generating an input for a generative remediator based on the detected cybersecurity issue, wherein the generative remediator is configured to generate an output including a remediation action based on the input; and initiating the remediation action in the computing environment.

13 Claims, 6 Drawing Sheets

SYSTEM AND METHOD FOR GENERATING CYBERSECURITY REMEDIATION IN COMPUTING ENVIRONMENTS

TECHNICAL FIELD

The present disclosure relates generally to cybersecurity remediation, and particularly to auto-generation of remediation actions in a cloud computing environment.

BACKGROUND

Cybersecurity threats can be present in computing environments in various ways. For example, in cloud computing environments, some threats include vulnerabilities, misconfigurations, exposures, exploitations, and the like.

Various solutions exist which monitor computing environments for cybersecurity threats, including threat detection, digital forensic solutions, and the like. While monitoring often requires read-level access to a computing environment, remediation and mitigation require performing and initiating actions in the computing environment which typically need a higher level of permissions and access than simply read-level access.

For reasons such as this, remediation solutions are slow to be adopted since organizations are hesitant to allow a third party such access on a continuous basis. Alternatively, remediation solutions can be maintained and provided by the organization itself in the computing environment, however, this requires a specialization that is costly to maintain.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include inspecting a computing environment for a cybersecurity object. Method may also include detecting a cybersecurity issue in the computing environment based on detection of the cybersecurity object. Method may furthermore include generating an input for a generative remediator based on the detected cybersecurity issue, where the generative remediator is configured to generate an output including a remediation action based on the input. Method may in addition include initiating the remediation action in the computing environment. Other embodiments of this aspect include corresponding computer systems, apparatus, and computer programs recorded on one or more computer storage devices, each configured to perform the actions of the methods.

Implementations may include one or more of the following features. Method may include: generating a prompt as the input, the prompt provided to a large language model (LLM) of the generative remediator. Method may include: generating a representation of the computing environment in a security database, the security database including a representation schema. Method where the prompt is generated based on any one of: a predefined template, the cybersecurity issue, and the representation schema. Method may include: generating the prompt further based on a predefined remediation action. Method may include: generating a plurality of remediation actions, each remediation action including a priority value; and generating a visual representation of each remediation action based on the priority value. Method may include: generating a plurality of remediation actions, each remediation action directed to a computing platform of a plurality of computing platforms of the computing environment, each computing platform associated with the detected cybersecurity issue; and receiving a selection of a first remediation action of the plurality of remediation actions, where the first remediation action, when initiated, remediates the cybersecurity issue. Method may include: receiving a selection of a preferred computing platform of a plurality of computing platforms of the computing environment; configuring the generative remediator to generate the output including the remediation action further based on the received selection of the preferred computing platform. Implementations of the described techniques may include hardware, a method or process, or a computer tangible medium.

In one general aspect, non-transitory computer-readable medium may include one or more instructions that, when executed by one or more processors of a device, cause the device to: inspect a computing environment for a cybersecurity object. Medium may furthermore detect a cybersecurity issue in the computing environment based on detection of the cybersecurity object. Medium may in addition generate an input for a generative remediator based on the detected cybersecurity issue, where the generative remediator is configured to generate an output including a remediation action based on the input. Medium may moreover initiate the remediation action in the computing environment. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: inspect a computing environment for a cybersecurity object. System may in addition detect a cybersecurity issue in the computing environment based on detection of the cybersecurity object. System may moreover generate an input for a generative remediator based on the detected cybersecurity issue, where the generative remediator is configured to generate an output including a remediation action based on the input. System may also initiate the remediation action in the computing environment. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: generate a prompt as the input, the prompt provided to a large language model (LLM) of the generative remediator. System where the memory contains further instructions which when executed by the processing circuitry further configure the system to: generate a representation of the computing environment in a security database, the security database including a representation schema. System where the prompt is generated based on any one of: a predefined template, the cybersecurity issue, and the representation schema. System where the memory contains further instructions which when executed by the processing circuitry further configure the system to: generate the prompt further based on a predefined remediation action. System where the memory contains further instructions which when executed by the processing circuitry further configure the system to: generate a plurality of remediation actions, each remediation action including a priority value; and generate a visual representation of each remediation action based on the priority value. System where the memory contains further instructions which when executed by the processing circuitry further configure the system to: generate a plurality of remediation actions, each remediation action directed to a computing platform of a plurality of computing platforms of the computing environment, each computing platform associated with the detected cybersecurity issue; and receive a selection of a first remediation action of the plurality of remediation actions, where the first remediation action, when initiated, remediates the cybersecurity issue. System where the memory contains further instructions which when executed by the processing circuitry further configure the system to: receive a selection of a preferred computing platform of a plurality of computing platforms of the computing environment; and configure the generative remediator to generate the output including the remediation action further based on the received selection of the preferred computing platform. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
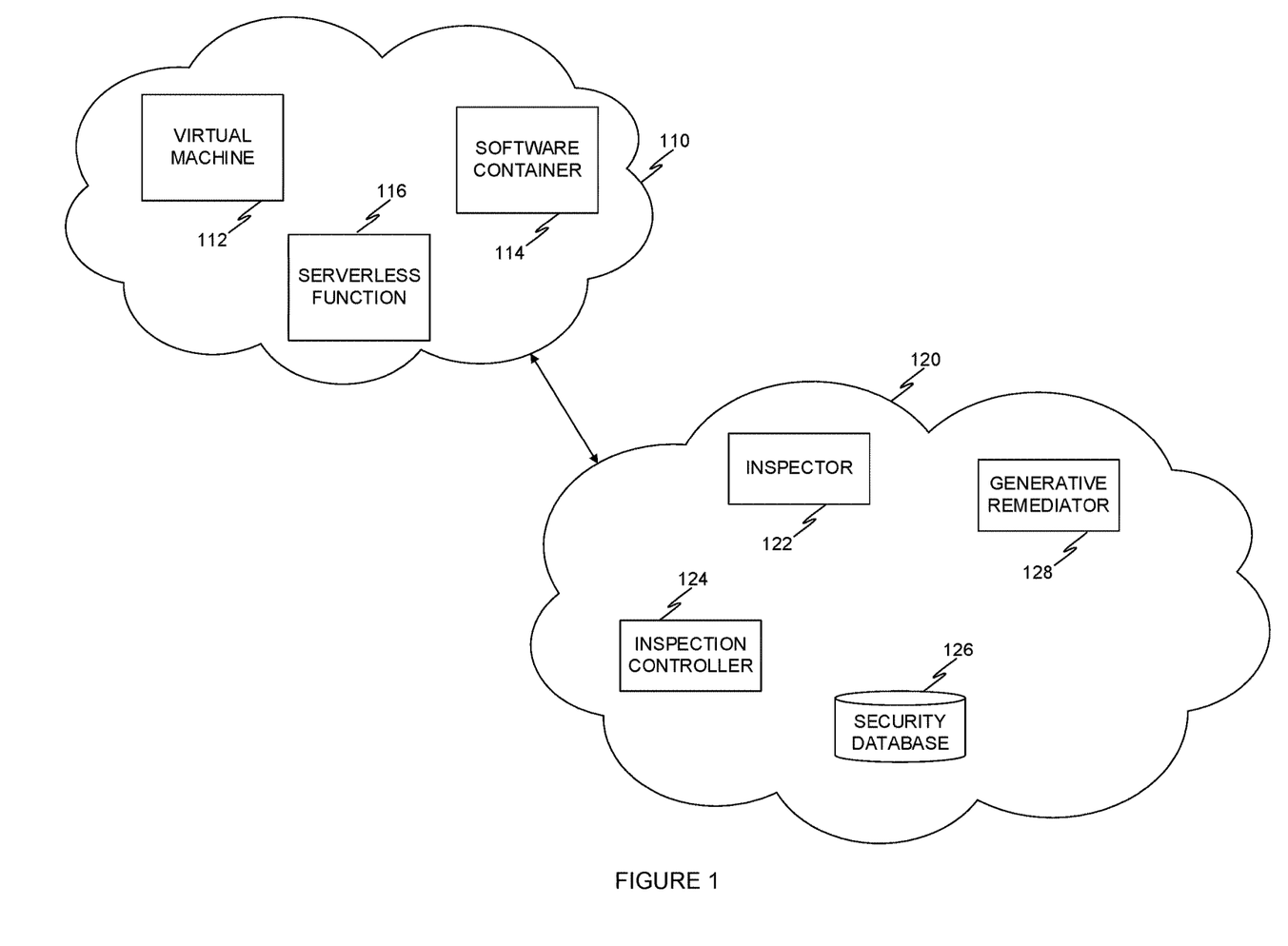
FIG. 1 is an example schematic diagram of a computing environment and an inspection environment with a generative remediator, implemented in accordance with an embodiment.

FIG. 1 is an example schematic diagram of a computing environment and an inspection environment with a generative remediator, implemented in accordance with an embodiment.

In an embodiment, a computing environment 110 includes a plurality of entities, such as resources, principals, and the like. For example, in an embodiment, the entities are cloud entities.

In some embodiments, the computing environment 110 is a cloud computing environment, an on-prem environment, a hybrid environment, a combination thereof, and the like. In certain embodiments, a cloud computing environment includes a virtual private cloud (VPC), a virtual network (VNet), and the like.

In certain embodiments, a cloud computing environment is deployed on a cloud computing infrastructure. In an embodiment, a cloud computing infrastructure is Amazon® Web Services (AWS), Google® Cloud Platform (GCP), Microsoft® Azure, and the like.

In certain embodiments, the computing environment 110 includes a plurality of resources, such as a virtual machine 112, a software container 114, a serverless function 116, various combinations thereof, and the like. According to some embodiments, a virtual machine 112 is, for example, Oracle® VirtualBox®, a software container 114 utilizes a Docker® Platform, and a serverless function 116 is Amazon® Lambda.

In some embodiments, the computing environment 110 includes a plurality of principals, such as user accounts, service accounts, local accounts, user groups, roles, various combinations thereof, and the like.

In an embodiment, a computing environment 110 is monitored by a cybersecurity inspection environment 120 (also known as inspection environment 120). In certain embodiments, the inspection environment 120 is implemented as a cloud computing environment, hybrid environment, on-prem environment, a combination thereof, and the like.

In an embodiment, the inspection environment 120 includes a plurality of inspector workloads, such as inspector 122. In some embodiments, the inspector 122 is configured to detect a cybersecurity object. For example, in an embodiment, an inspector 122 is configured to detect a cybersecurity object on a disk associated with a virtual machine 112. In an embodiment, an inspectable disk is generated, for example utilizing a clone, a copy, a snapshot, and the like, which are generated based on the disk of the virtual machine 112.

In some embodiments, the inspectable disk is inspected by the inspector 122. This allows to perform, for example, static analysis on the disk without perturbing the virtual machine 112 or utilizing resources thereof. In an embodiment, the cybersecurity object is a file, a secret, a password, a sensitive data, a code object, a hash, a key, a certificate, a registry file, a library, a software package, a binary, an application, an operating system, a malware, a nested workload, a combination thereof, and the like.

In certain embodiments, a cybersecurity object is utilized in detecting a cybersecurity risk. For example, in an embodiment, a secret, a password, and the like, are stored as cleartext, plaintext, and the like, which is readily accessible. In such embodiments, the secret, for example, is more exposed by storing it in this manner, and therefore presents a higher cybersecurity risk. In some embodiments, the secret provides access to another resource, thereby creating a cybersecurity risk of a lateral movement path.

In some embodiments, an inspection controller 124 is configured to utilize a service account in the computing environment 110 to initiate generation of the inspectable disk. In certain embodiments, the inspection controller 124 is configured to generate inspector workloads, such as the inspector 122, in response to demand for inspector workloads. For example, in an embodiment, the inspection controller 124 is configured with a permission to instantiate a virtual instance which executes an application configured to inspect an inspectable disk for a cybersecurity object.

According to some embodiments, an inspector 122 is configured to store data, information, and the like, pertaining to cybersecurity objects, inspection, etc. in a security database 126. In some embodiments, the security database 126 includes a constraint, a predefined data schema, and the like, which is utilized to represent the computing environment 110.

In some embodiments, a data schema of the security database 126 is utilized to represent a computing environment 110 utilizing a plurality of data templates, each template describing a different entity. For example, in an embodiment, a first data template is utilized to describe a resource, and a second data template is utilized to describe a principal. In an embodiment, the first data template is utilized to describe any resource in the computing environment 110, i.e., the first data template is utilized to represent the virtual machine 112, the serverless function 116, and the software container 114.

In certain embodiments, the security database 126 is implemented as a tabular database, a columnar database, a SQL database, No-SQL database, a graph database, various combinations thereof, and the like. For example, in an embodiment, the security database 126 is a graph database, such as Neo4j®, where principals, resources, remediation actions, cybersecurity risks, cybersecurity objects, enrichments, endpoints, and the like, are stored as nodes on a graph stored in the security database 126. An example representation of a computing environment is discussed in more detail with respect to FIG. 2 below.

According to an embodiment, the inspection environment 120 further includes a generative remediator 128. In an embodiment, a generative remediator includes a generative artificial intelligence model, such as a large language model (LLM). In some embodiments, the LLM is, for example, OpenAIR ChatGPT®, Google® PaLM®, Meta® LLaMa®, and the like.

In certain embodiments, the generative remediator 128 is configured to generate a remediation action. In some embodiments, the generative remediator 128 is configured to generate the remediation action in response to detecting a cybersecurity threat, a cybersecurity risk, and the like, for example based on detecting a cybersecurity object. In an embodiment, a cybersecurity threat includes a misconfiguration, a vulnerability, an exposure, various combinations thereof, and the like.

In some embodiments, a cybersecurity threat is detected in response to detecting a plurality of cybersecurity objects, a cybersecurity object and an attack path (e.g., an exposure), a cybersecurity object and a vulnerability, various combinations thereof, and the like. In an embodiment, such combinations are also referred to as toxic combinations.

In an embodiment, the generative remediator 128 is configured to generate a prompt for an LLM. In some embodiments, the prompt is generated based on a representation schema of the security database 126, a finding (e.g., a result of a cybersecurity inspection, such as detection of a cybersecurity object), a predefined action, a combination thereof, and the like.

According to an embodiment, the generative remediator 128 is configured to generate the prompt based on a predefined template. In an embodiment, generating a prompt based on a predefined template includes parsing an input received by the generative remediator 128, detecting therein values of data fields, and adapting the predefined template based on the detected data values.

In certain embodiments, it is advantageous to provide an LLM with a prompt that includes the data schema used for representation (i.e., the representation schema) as this reduces the need to fine-tune an LLM.

In some embodiments, the generative remediator 128 is further configured to initiate the remediation action. In certain embodiments, the remediation action is: initiated on a resource, initiated on a principal, a combination thereof, and the like.

For example, according to an embodiment, a remediation action includes: revoking access to a resource, revoking access from a resource, revoking access from a principal, revoking access to a principal, updating a permission of a principal, changing a user group of a principal, changing a role of a principal, revoking an access token, sandboxing a resource, configuring a firewall to filter traffic to the resource, configuring a firewall to filter traffic from the resource, generating an alert, installing a patch, removing a software application from a resource, updating a software package, removing a software package, a combination thereof, and the like.

Figure 2:
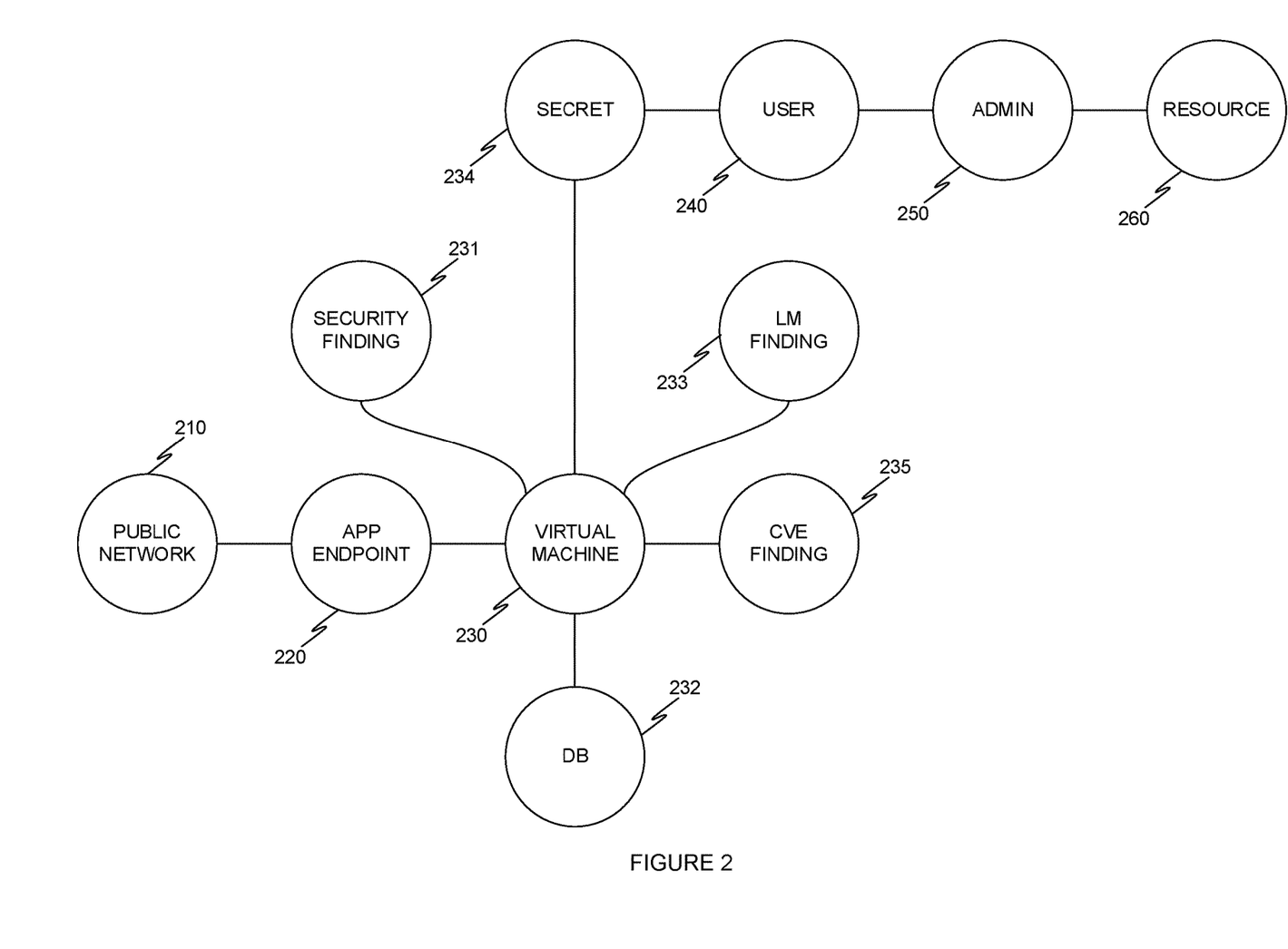
FIG. 2 is an example illustration of a security graph, implemented in accordance with an embodiment.

FIG. 2 is an example illustration of a security graph, implemented in accordance with an embodiment. In an embodiment, a virtual machine is inspected for cybersecurity objects, for example by an inspector discussed in more detail throughout.

According to an embodiment, an inspector, inspection controller, and the like, is configured to generate a representation of the virtual machine, for example as virtual machine (VM) node 230. In an embodiment, the inspector is configured to detect an application endpoint, represented as endpoint node 220. The application endpoint allows the virtual machine to connect to a public network, such as the internet. In an embodiment, the endpoint node 220 is connected to a public network node 210, which represents that the application endpoint can access the public network.

In some embodiments, the inspector is further configured to detect hosted technologies. For example, according to an embodiment, a hosted technology, such as a database, is represented by a hosted technology node. In some embodiments, a database is represented by database (DB) node 232, and the DB node 232 is connected to the VM node 230, to indicate that the DB is hosted on the VM.

According to an embodiment, an inspector is configured to detect a secret on the VM. In some embodiments, a single inspector is configured to detect multiple cybersecurity objects. In other embodiments, each inspector is configured to detect a single cybersecurity object.

In an embodiment, the detected secret is represented by a secret node 234, connected to the VM node 230. In some embodiments, the detected secret is associated with a user account, represented by user node 240. In an embodiment, the user account is configured to assume an administrator account, represented by admin node 250. In an embodiment, the administrator account is configured to access a resource, such as a bucket, which exposes the data therein. In some embodiments, the resource is represented by resource node 260.

In certain embodiments, an inspector is configured to detect a cybersecurity object which indicates that the VM includes a vulnerability, an exposure, a misconfiguration, and the like, represented, for example, by CVE (common vulnerabilities and exposures) node 235. For example, in an embodiment, the CVE node 235 represents a Log4Shell vulnerability in Log4j. The CVE node 235 is connected to the VM node 230, according to an embodiment, to indicate that the vulnerability was detected on the VM.

In some embodiments, a security finding is represented by security finding node 231. For example, according to an embodiment, a log, such as a network log, a cloud log, an event log, and the like, are accessed. In some embodiments, the log is parsed to detect an identifier of the VM.

In an embodiment, an event is detected in the log which corresponds to a security finding, respective of the identifier. For example, in an embodiment, a plurality of unsuccessful access events indicate that a brute force attack was attempted on the VM. In some embodiments, the security finding node 231 is connected to the VM node 230, to indicate that the security finding was detected with respect to the VM.

In certain embodiments, a security database is configured to detect a potential lateral movement path from the VM (VM node 230) to the resource (resource node 260) by gaining access to the VM, for example by brute force, gaining access to the secret stored thereon, and from there utilizing the user to gain admin access to the resource. In an embodiment, a lateral movement (LM) path, potential lateral movement path, and the like, is represented by an LM finding node 233, connected to the VM node 230, to indicate that a lateral movement path, for example, is present between the VM node 230 and another resource.

In some embodiments, a toxic combination is defined by a policy, a condition, a rule, a combination thereof, and the like. For example, in the above embodiment, a vulnerability combined with a secret is a higher cybersecurity risk than if either one of those findings were present individually.

It is advantageous to detect such toxic combinations, as they allow to initiate remediation actions at multiple points (e.g., each element of the toxic combination) to deal with the cybersecurity threat.

In certain embodiment, a node representing a finding, a cybersecurity risk, a cybersecurity object, and the like, is connected to a remediation node, wherein the remediation node represents a remediation action. In some embodiments, a generative remediator is configured to detect the remediation action based on the remediation node, and adapt a remediation action template to a specific finding, for example.

Figure 3:
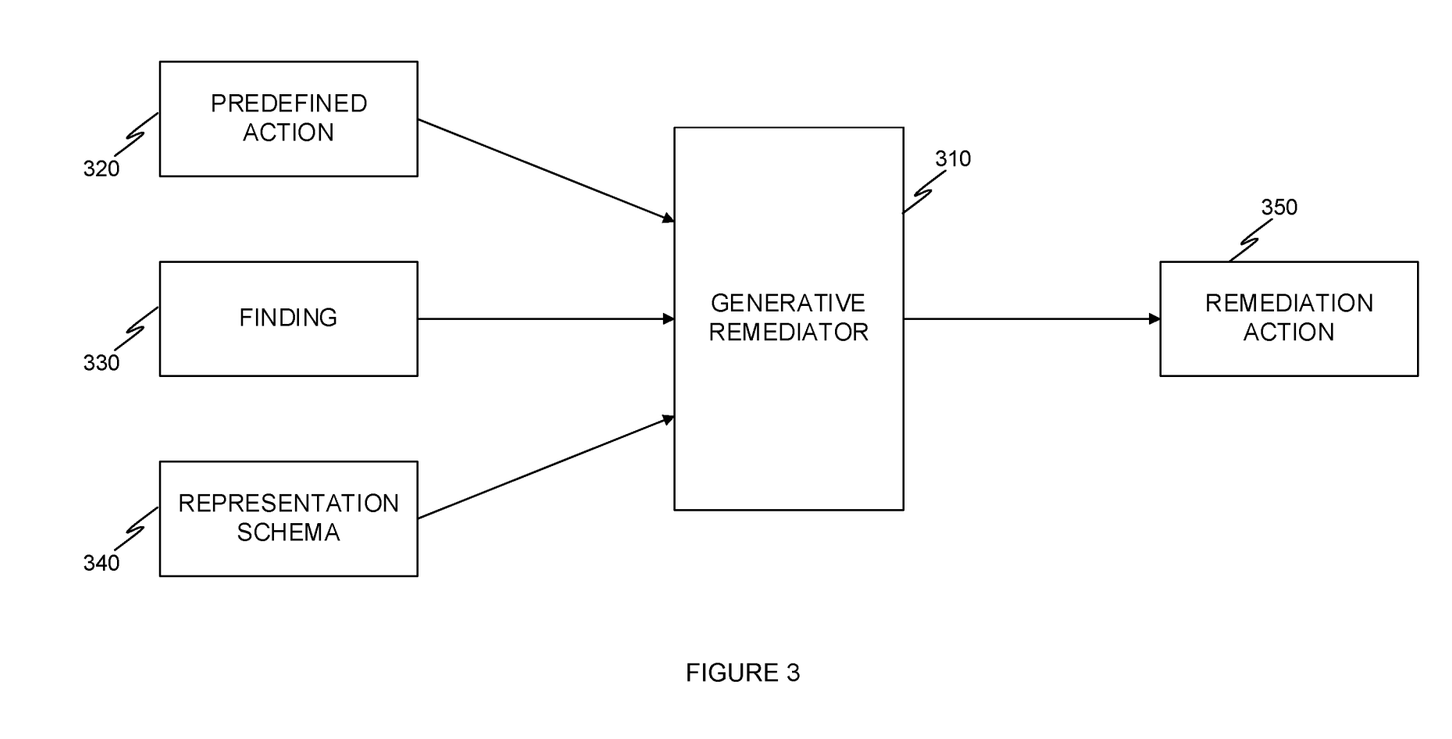
FIG. 3 is an example schematic diagram of a generative remediator data flow, implemented in accordance with an embodiment.

FIG. 3 is an example schematic diagram of a generative remediator data flow, implemented in accordance with an embodiment. In an embodiment, a generative remediator 310 is configured to receive a plurality of inputs. In some embodiments, a received input is a predefined action 320, a finding 330, a representation schema 340, a combination thereof, and the like.

In an embodiment, a predefined action 320 is a remediation action, a remediation script, an instruction, a combination thereof, and the like. In some embodiments, the predefined action 320 includes a template, a predefined value, a combination thereof, and the like.

In certain embodiments, a finding 330 is generated by a security graph, by an inspector, by an inspection controller, and the like, for example based on a cybersecurity object detected in a computing environment.

In some embodiments, the finding 330 is a security finding, a lateral movement finding, a CVE finding, a privilege escalation finding, various combinations thereof, and the like. In some embodiments, a security finding indicates a cybersecurity issue, a toxic combinations of cybersecurity issues, and the like. For example, in an embodiment, a cybersecurity issue is a vulnerability, a misconfiguration, an exposure, an attack path, a combination thereof, and the like.

In an embodiment, a security finding is generated, for example, based on detecting an event in a log. A security finding is, for example, detecting a brute force attack (e.g., multiple failed login attempts). According to an embodiment, a lateral movement finding includes detecting a lateral movement path between a first resource and a second resource, for example by traversing a security graph in a security database to detect a potential lateral movement path. In an embodiment, a lateral movement finding includes a secret, a key, a principal, and the like, which connect the first resource to the second resource.

According to an embodiment, a representation schema includes a database schema, constraints, and the like, which are utilized to represent a computing environment, findings thereof, enrichments thereof, remediation actions, cybersecurity risks, cybersecurity threats, cybersecurity objects, and the like, in a security database.

In an embodiment, the generative remediator 310 is configured to receive a user input as a further input. For example, in an embodiment, a user input indicates a platform preference in which to remediate a cybersecurity issue.

In certain embodiments, a computing environment includes multiple platforms, such as CLI (command line interface), a cloud computing console, an infrastructure as code (IaC) platform, various combinations thereof, and the like. Additionally, in some embodiments, various remediation actions are deployable in a production environment, for example by instructing an admission controller, a sensor, and the like, to initiate the remediation action.

Therefore, according to an embodiment, a cybersecurity issue can be remediated from multiple points in an environment. For example, a cybersecurity issue can be detection of an exposure as a result of a misconfiguration (e.g., a database having sensitive data which is not password protected, hosted on a virtual machine having deployed thereon a sensor).

In an embodiment, remediating the cybersecurity issue above includes any of: configuring the sensor to set a password for the database, updating a code object in an IaC file (e.g., a Terraform® file), from which the VM with the hosted database was deployed to include password protection, etc. In certain embodiments, a user preference is determined respective of a platform in which to remediate the cybersecurity issue. In some embodiments, a plurality of preferred platforms are selected.

According to an embodiment, the generative remediator 310 is configured to generate a remediation action 350. In some embodiments, the remediation action 350 includes a remediation script, e.g., a plurality of code lines which when executed in a computing environment, remediate a cybersecurity issue.

In certain embodiments, the generative remediator 310 is configured to generate a plurality of remediation actions. In some embodiments, the generative remediator 310 is configured to generate a priority value for each of the plurality of remediation actions. For example, in an embodiment, a priority value is generated based on a past indicator of success. This is advantageous as remediation actions which were found in the past to be effective at remediating the cybersecurity issue, are likely effective for a current cybersecurity threat.

Figure 4:
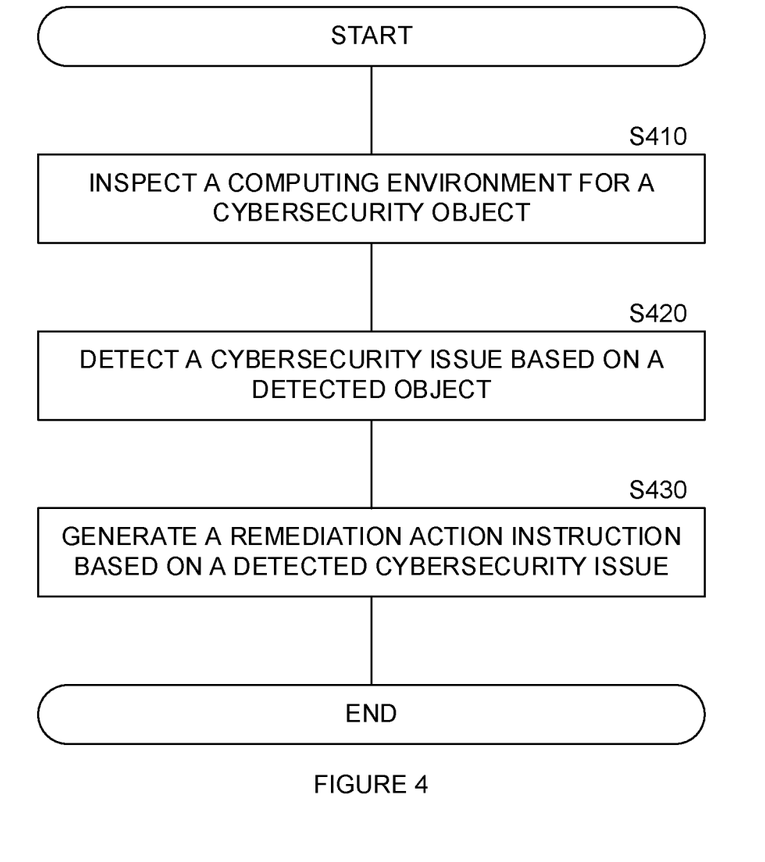
FIG. 4 is an example flowchart of a method for generating a remediation action, implemented in accordance with an embodiment.

FIG. 4 is an example flowchart of a method for generating a remediation action, implemented in accordance with an embodiment.

At S410, a computing environment is inspected for a cybersecurity object. In an embodiment, inspecting a computing environment for a cybersecurity object includes detecting a plurality of resources deployed in a computing environment.

In certain embodiments, detecting the plurality of resources includes, for example, entity discovery. In an embodiment, entity discovery includes querying an application programming interface (API) of a computing environment, such as a cloud computing environment, to determine what resources, workloads, and the like, are deployed therein.

For example, according to an embodiment, a cloud API is accessed to determine what virtual machines, software containers, serverless functions, microservices, buckets, storage, software repositories, and the like, are deployed in the computing environment.

In an embodiment, a resource is inspected to detect therein a nested resource. For example, in an embodiment, a virtual machine is configured to host a software container platform (e.g., Kubernetes), and each of the virtual machine, and the software containers deployed thereon, are individually inspected for cybersecurity objects.

In some embodiments, inspecting a computing environment includes generating an inspectable disk, based on an original disk which is deployed in the computing environment. In certain embodiments, generating an inspectable disk includes generating a clone, a copy, a snapshot, a combination thereof, and the like, of the original disk.

According to an embodiment, an inspectable disk is generated on-demand in response to a request for initiating inspection of the original disk, and a resource allocated to the inspectable disk is released in response to determining that inspection is complete.

In some embodiments, a plurality of inspectors are allocated to inspect an inspectable disk for a cybersecurity object, each inspector configured to inspect for a different cybersecurity object. For example, in an embodiment, a first inspector is configured to inspect for nested workloads, while a second inspector is configured to inspect for a secret.

In an embodiment, the cybersecurity object is a file, a secret, a password, a sensitive data, a code object, a hash, a key, a certificate, a registry file, a library, a software package, a binary, an application, an operating system, a malware, a nested workload, a combination thereof, and the like.

At S420, a cybersecurity issue is detected. In an embodiment, a cybersecurity issue is detected based on detection of a cybersecurity object. In some embodiments, the cybersecurity issue is detected based on a combination of detecting a cybersecurity object, and a finding. For example, in an embodiment, a finding is a security finding, a lateral movement finding, a privilege escalation finding, a vulnerability, an exposure, a misconfiguration, a malware, an attack path, various combinations thereof, and the like.

As an example, a combination, also known as a toxic combination, includes detecting a vulnerability, such as a hosted technology running an application which has a known vulnerability, together with an endpoint (e.g., indicating public network access), where the hosted technology is configured to assume a service account having a high permission.

In certain embodiments, detecting a toxic combination includes applying a policy, a rule, a condition, and the like, on a representation of a computing environment. In some embodiments, a security database is queried based, for example, on a preexisting query which is configured to detect a toxic combination. For example, in some embodiments, a security graph is traversed to detect nodes which correspond to a query directed at a security graph, such as the graph discussed in more detail with respect to FIG. 2 above.

In certain embodiments, multiple cybersecurity issues are detected. In some embodiments, each cybersecurity issue includes a priority score, a severity score, a combination thereof, and the like. For example, in an embodiment, a score is a qualitative score (e.g., low, medium, high), a quantitative score (e.g., 1 through 10), a combination thereof, and the like.

At S430, a remediation action is generated. In an embodiment, the remediation action is generated by a generative remediator configured to generate remediation actions. In some embodiments, the remediation action is generated based on the cybersecurity issue.

In an embodiment, a generative remediator is configured to receive a cybersecurity issue, including, for example, an identifier of a resource (e.g., a name in a namespace, an IP address, etc.), data pertaining to the cybersecurity object, and the like, and generate the remediation action based on the received input.

In some embodiments, the remediation action is generated based on a template, for example including a code template. In an embodiment, the code template includes machine-readable instructions, which when executed in a computing environment, such as a cloud computing environment, cause the remediation action to initiate.

In some embodiments, the generative remediator is configured to generate a prompt for a large language model (LLM), configured to generate a remediation action. In an embodiment, the prompt is generated based on a template, for example based on the code template.

In some embodiments, a first LLM is utilized to generate the prompt, and a second LLM is utilized to generate the remediation action. In an embodiment, the first LLM and the second LLM are the same model.

In an embodiment, the prompt, when provided to an LLM model, configures the LLM model to generate an output which includes a remediation action. In an embodiment, the remediation action includes a remediation script, a plurality of remediation scripts, etc. In an embodiment, a remediation script includes code, such as high-level code. In some embodiments, high-level code scripts are, for example, Python® scripts.

Figure 5:
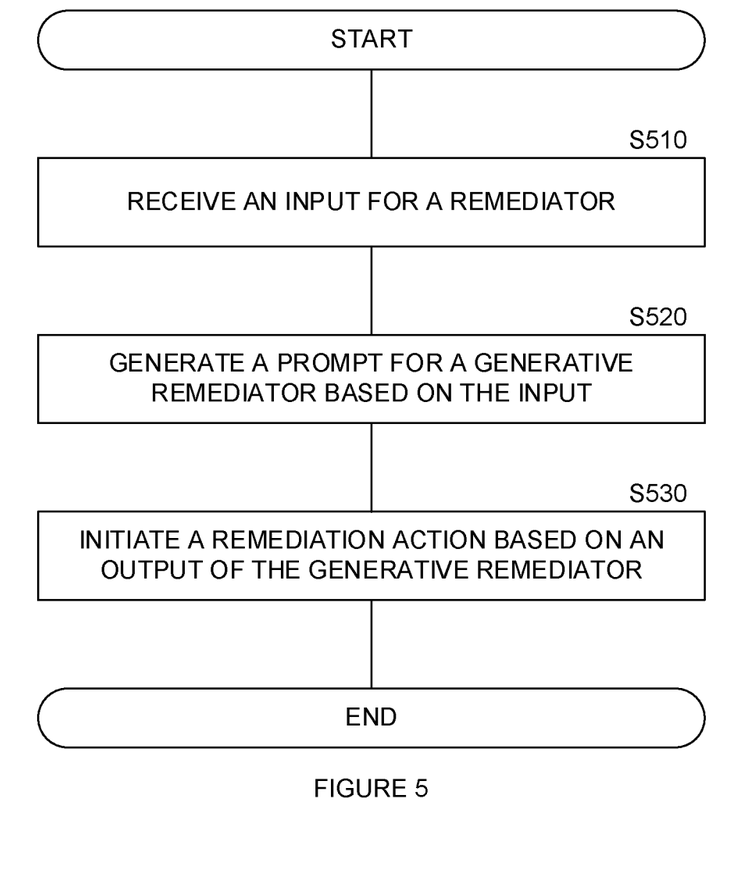
FIG. 5 is an example flowchart of a method for initiating a remediation action, according to an embodiment.

FIG. 5 is an example flowchart of a method for initiating a remediation action, according to an embodiment. In an embodiment, the initiated remediation action is generated by a generative remediator, discussed in more detail with respect to FIG. 4 above.

At S510, an input is received. In an embodiment, the received input is provided to a generative remediator. In some embodiments, the received input includes a cybersecurity issue, a cybersecurity alert, predefined action, a finding, a representation schema, a combination thereof, and the like.

In an embodiment, a predefined action is a remediation action, a remediation script, an instruction, a combination thereof, and the like. In some embodiments, the predefined action includes a template, a predefined value, a combination thereof, and the like.

In certain embodiments, a finding is generated by a security graph, by an inspector, by an inspection controller, and the like, for example based on a cybersecurity object detected in a computing environment.

In some embodiments, the finding is a security finding, a lateral movement finding, a CVE finding, a privilege escalation finding, various combinations thereof, and the like. In some embodiments, a security finding indicates a cybersecurity issue, a toxic combinations of cybersecurity issues, and the like. For example, in an embodiment, a cybersecurity issue is a vulnerability, a misconfiguration, an exposure, an attack path, a combination thereof, and the like.

In an embodiment, a security finding is generated, for example, based on detecting an event in a log. A security finding is, for example, detecting a brute force attack (e.g., multiple failed login attempts). According to an embodiment, a lateral movement finding includes detecting a lateral movement path between a first resource and a second resource, for example by traversing a security graph in a security database to detect a potential lateral movement path. In an embodiment, a lateral movement finding includes a secret, a key, a principal, and the like, which connect the first resource to the second resource.

According to an embodiment, a representation schema includes a database schema, constraints, and the like, which are utilized to represent a computing environment, findings thereof, enrichments thereof, remediation actions, cybersecurity risks, cybersecurity threats, cybersecurity objects, and the like, in a security database.

In an embodiment, a generative remediator is configured to receive a user input as a further input. For example, in an embodiment, a user input indicates a platform preference in which to remediate a cybersecurity issue.

At S520, a prompt is generated. In an embodiment, the prompt is generated by a first LLM, and provided as an input to a second LLM. In some embodiments, the first LLM is the second LLM.

In some embodiments, the generative remediator is configured to generate a prompt for a large language model (LLM), configured to generate a remediation action. In an embodiment, the prompt is generated based on a template, for example based on the code template.

In an embodiment, the prompt, when provided to an LLM model, configures the LLM model to generate an output which includes a remediation action. In an embodiment, the remediation action includes a remediation script, a plurality of remediation scripts, etc. In an embodiment, a remediation script includes code, such as high-level code. In some embodiments, high-level code scripts are, for example, Python® scripts.

At S530, a remediation action is initiated. In an embodiment, the remediation action is generated based on an output of the LLM. For example, according to an embodiment, providing an LLM with the generated prompt of S520 configures the LLM to generate an output which includes a remediation action.

In an embodiment, initiating a remediation action includes executing an instruction, a plurality of instructions, and the like, in a computing environment. In certain embodiments, the initiated remediation action is initiated with respect to a computing platform of a plurality of computing platforms deployed in the computing environment. For example, a computing environment is, according to an embodiment, a command line interface (CLI), an infrastructure as code (IaC) platform, a console, a sensor, an admission controller, a combination thereof, and the like.

Figure 6:
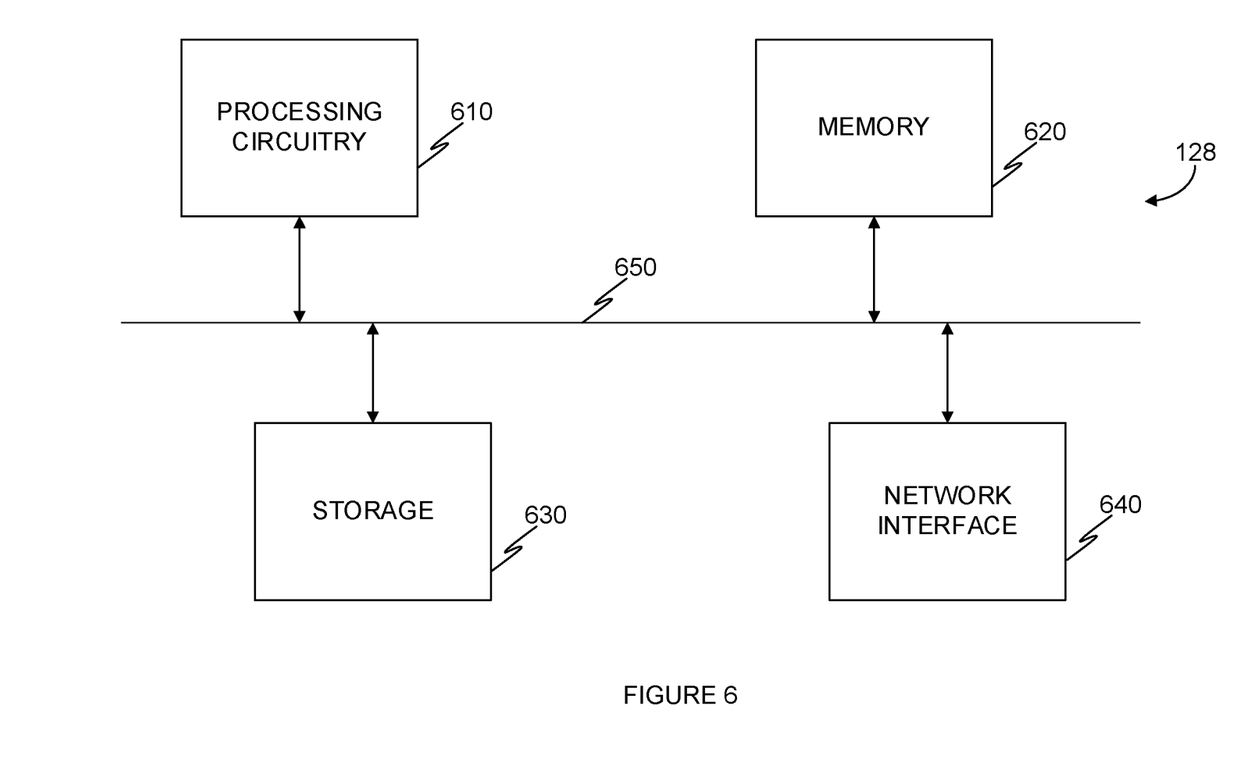
FIG. 6 is an example schematic diagram of a generative remediator according to an embodiment.

FIG. 6 is an example schematic diagram of a generative remediator 128 according to an embodiment. The generative remediator 128 includes a processing circuitry 610 coupled to a memory 620, a storage 630, and a network interface 640. In an embodiment, the components of the generative remediator 128 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof. In an embodiment, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein may be stored in the storage 630, in the memory 620, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 640 is configured to provide the generative remediator 128 with communication with, for example, the inspector 122, the inspection controller 124, the security database 126, and the like.

It should be understood that the embodiments described herein are not limited to the specific architecture illustrated in FIG. 6, and other architectures may be equally used without departing from the scope of the disclosed embodiments.

Furthermore, in certain embodiments the inspector 122, the inspection controller 124, and the security database 126 may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a remediation action in a computing environment based on a cybersecurity inspection, comprising:
   inspecting a computing environment for a cybersecurity object;
   detecting a cybersecurity issue in the computing environment based on detection of the cybersecurity object;
   generating a representation of the computing environment in a security database, the security database including a representation schema;
   generating a prompt as an input for a large language model (LLM) of a generative remediator based on the detected cybersecurity issue, wherein the generative remediator is configured to generate an output including a remediation action based on the input; and
   initiating the remediation action in the computing environment.

2. The method of claim 1, wherein the prompt is generated based on any one of: a predefined template, the cybersecurity issue, and the representation schema.

3. The method of claim 1, further comprising:
   generating the prompt further based on a predefined remediation action.

4. The method of claim 1, further comprising:
   generating a plurality of remediation actions, each remediation action including a priority value; and
   generating a visual representation of each remediation action based on the priority value.

5. The method of claim 1, further comprising:
   generating a plurality of remediation actions, each remediation action directed to a computing platform of a plurality of computing platforms of the computing environment, each computing platform associated with the detected cybersecurity issue; and
   receiving a selection of a first remediation action of the plurality of remediation actions, wherein the first remediation action, when initiated, remediates the cybersecurity issue.

6. The method of claim 1, further comprising:
   receiving a selection of a preferred computing platform of a plurality of computing platforms of the computing environment;
   configuring the generative remediator to generate the output including the remediation action further based on the received selection of the preferred computing platform.

7. A non-transitory computer-readable medium storing a set of instructions for generating a remediation action in a computing environment based on a cybersecurity inspection, the set of instructions comprising:
   one or more instructions that, when executed by one or more processors of a device, cause the device to:
   inspect a computing environment for a cybersecurity object;
   detect a cybersecurity issue in the computing environment based on detection of the cybersecurity object;
   generate a representation of the computing environment in a security database, the security database including a representation schema;
   generate a prompt as an input for a large language model (LLM) of a generative remediator based on the detected cybersecurity issue, wherein the generative remediator is configured to generate an output including a remediation action based on the input; and
   initiate the remediation action in the computing environment.

8. A system for generating a remediation action in a computing environment based on a cybersecurity inspection comprising:
- a processing circuitry;
- a memory, the memory containing instructions that, when executed by the processing circuitry, configure the system to:
- inspect a computing environment for a cybersecurity object;
- detect a cybersecurity issue in the computing environment based on detection of the cybersecurity object;
- generate a representation of the computing environment in a security database, the security database including a representation schema;
- generate a prompt as an input for a large language model (LLM) of a generative remediator based on the detected cybersecurity issue, wherein the generative remediator is configured to generate an output including a remediation action based on the input; and
- initiate the remediation action in the computing environment.

9. The system of claim 8, wherein the prompt is generated based on any one of:
- a predefined template, the cybersecurity issue, and the representation schema.

10. The system of claim 8, wherein the memory contains further instructions which when executed by the processing circuitry further configure the system to:
- generate the prompt further based on a predefined remediation action.

11. The system of claim 8, wherein the memory contains further instructions which when executed by the processing circuitry further configure the system to:
- generate a plurality of remediation actions, each remediation action including a priority value; and
- generate a visual representation of each remediation action based on the priority value.

12. The system of claim 8, wherein the memory contains further instructions which when executed by the processing circuitry further configure the system to:
- generate a plurality of remediation actions, each remediation action directed to a computing platform of a plurality of computing platforms of the computing environment, each computing platform associated with the detected cybersecurity issue; and
- receive a selection of a first remediation action of the plurality of remediation actions, wherein the first remediation action, when initiated, remediates the cybersecurity issue.

13. The system of claim 8, wherein the memory contains further instructions which when executed by the processing circuitry further configure the system to:
- receive a selection of a preferred computing platform of a plurality of computing platforms of the computing environment; and
- configure the generative remediator to generate the output including the remediation action further based on the received selection of the preferred computing platform.

* * * * *

UNITED STATES PATENT AND TRADEMARK OFFICE
CERTIFICATE OF CORRECTION

| | | |
|---|---|---|
| PATENT NO. | : 12,095,786 B1 | Page 1 of 1 |
| APPLICATION NO. | : 18/543497 | |
| DATED | : September 17, 2024 | |
| INVENTOR(S) | : Itay Arbel et al. | |

It is certified that error appears in the above-identified patent and that said Letters Patent is hereby corrected as shown below:

In the Specification

DETAILED DESCRIPTION
Please amend Column 5, Line 60 as follows:
According to an embodiment, the inspection environment 120 further includes a generative remediator 128. In an embodiment, a generative remediator includes a generative artificial intelligence model, such as a large language model (LLM). In some embodiments, the LLM is, for example, OpenAI®, ChatGPT®, Google® PaLM®, Meta® LLaMa®, and the like.

Signed and Sealed this
Eighth Day of April, 2025

Coke Morgan Stewart
*Acting Director of the United States Patent and Trademark Office*